United States Patent [19]
Jonsson

[11] Patent Number: 5,722,708
[45] Date of Patent: Mar. 3, 1998

US005722708A

[54] BUMPER STRUCTURE

[75] Inventor: Martin Jonsson, Luleå, Sweden

[73] Assignee: Plannja Hardtech AB, Lulea, Sweden

[21] Appl. No.: 686,269

[22] Filed: Jul. 25, 1996

Related U.S. Application Data

[63] Continuation-in-part of PCT/SE95/00054, Jan. 20, 1995.

[30] Foreign Application Priority Data

Jan. 26, 1994 [SE] Sweden .................. 9400227

[51] Int. Cl.⁶ .................................. B60R 19/02
[52] U.S. Cl. .................................. 293/102; 243/122
[58] Field of Search .................. 293/120, 122, 293/102, 132, 136; 296/146.6, 188, 189, 205

[56] References Cited

U.S. PATENT DOCUMENTS

| | | |
|---|---|---|
| 4,073,528 | 2/1978 | Klie . |
| 4,474,395 | 10/1984 | Harloff et al. ............ 293/120 |
| 4,826,226 | 5/1989 | Klie et al. ............ 293/136 |
| 5,067,759 | 11/1991 | Fleming ............ 293/120 |
| 5,080,411 | 1/1992 | Stewart et al. . |
| 5,306,058 | 4/1994 | Sturrus et al. ............ 293/122 |
| 5,393,111 | 2/1995 | Eipper et al. ............ 293/120 |

FOREIGN PATENT DOCUMENTS

| | | | |
|---|---|---|---|
| 404208643 A | 7/1992 | Japan ............ | 296/188 |
| 1156929 | 5/1985 | U.S.S.R. ............ | 296/188 |
| 9304897 | 3/1993 | WIPO . | |
| 9420322 | 9/1994 | WIPO . | |

*Primary Examiner*—Gary C. Hoge
*Attorney, Agent, or Firm*—Nils H. Ljungman and Associates

[57] ABSTRACT

A bumper bar construction, as for use with automobiles to absorb collision impact energies, has a closed trapezoidal cross-sectional shape. The bumper bar construction includes a broad flange on one broad side of the trapezium and a narrow flange on the opposite, narrow side of the trapezium. The broad and narrow flanges extend generally in mutually parallel planes. The bumper bar construction further includes two mutually convergent webs which join the two flanges together.

15 Claims, 4 Drawing Sheets

BUMPER STRUCTURE

CONTINUING APPLICATION DATA

This application is a continuation-in-part of International Patent Application No. PCT/SE95/00054 filed on Jan. 20, 1995 and published on Aug. 3, 1995, which claims priority from Swedish Patent Application No. 9400227-6 filed on Jan. 26, 1994. International Patent Application No. PCT/SE95/00054 was pending as of the filing date of this application and designated the United States of America as a designated state.

BACKGROUND OF THE INVENTION

1. Field of the Invention

The present invention relates to a bumper bar construction which is primarily intended for use with automobiles to absorb collision impact energies, although it will be understood that the use of the inventive bumper bar construction is not limited to automobiles, but can be used in all cases in which impact energy is to be absorbed by deformation of the bumper bar.

2. Background of the Invention

The inventive bumper bar construction has a closed trapezoidal cross-sectional shape and includes a broad flange on one broad side of the trapezium and a narrow flange on the opposite narrow side of the trapezium, said broad and said narrow flanges extending generally in mutually parallel planes, and further includes two mutually convergent webs which join the two flanges together.

OBJECT OF THE INVENTION

The object of the present invention is to provide a bumper bar construction of the type defined in the introduction which when subjected to impact will absorb impact energy by controlled deformation of the bumper bar up to the point at which the bar possibly collapses.

SUMMARY OF THE INVENTION

The inventive bumper bar construction is characterized in that the respective webs of the trapezium cross-section have at least one bend guide, such as a fold, which extends along the bumper bar, and in that a part of the web that is located proximal to the broad web on the bar is bent outwards from the centre line of said bar. The bumper bar is intended to be mounted on either end of e.g. an automobile, with the aid of fastener means attached to one of the two flanges. When the bumper bar is subjected to a force which acts at right angles to the flanges, the bend guides function to cause the webs of the bumper bar to bend successively towards the broad flange. The webs will continue to bend and to absorb energy until the two flanges are contiguous with one another. If the force continues to act on the bumper, the flanges will thereafter deform and the bumper beam will totally collapse.

The bend guide in respective webs will preferably have the form of a sharp fold, although it may also have other forms of course.

Further details and characteristic features of the inventive bumper bar construction will be apparent from the following claims and also from the following description made with reference to the accompanying drawings.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is in the following disclosed in the form of embodiments with reference to the accompanying drawings.

DESCRIPTION OF THE PREFERRED EMBODIMENTS

Figure 1A:
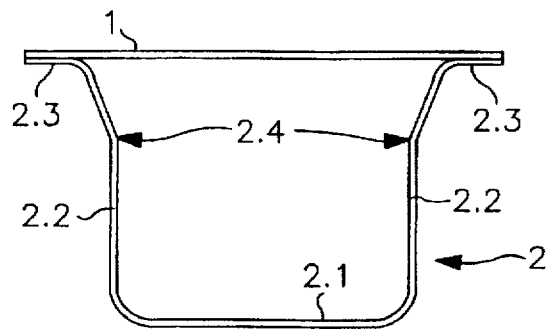
FIG. 1A is a cross-sectional view of a first embodiment of an inventive bumper bar construction.

The inventive bumper bar construction is shown in cross-section in FIG. 1A and is made of thin metal sheet. The bumper bar includes a broad flange 1, which is comprised of flat elongated metal sheet, and an open generally U-shaped profile 2 having a narrow flange 2.1 which is embraced by two webs 2.2. The webs 2.2 have edge flanges 2.3 which extend away from one another in a common plane, preferably parallel with the plane through the narrow flange, and to which the broad flange 1 is welded, for instance by spot welding of the assembled bumper bar construction. The U-shaped profile 2 may be rolled or pressed to a trapezoidal cross-sectional shape from metal sheet, with the narrow flange 2.1 having a smaller width than the opening of the U-shaped profile 2 that faces towards the broad flange 1. The webs 2.2 also have folds 2.4 which extend along the U-shaped profile 2 and from which the outer parts of the webs 2.2 with the edge flanges 2.3 are bent outwardly from one another at a mutual angle which is larger than the mutual angle between the webs 2.2 at the narrow flange 2.1. The fold 2.4 is spaced from the broad flange 1 by a distance which corresponds at most to one third the height of the web 2.2, preferably at a distance which corresponds from one eighth to one third of said height of the web.

Figure 2A:
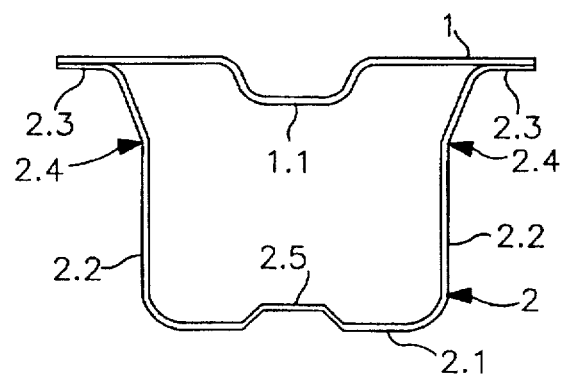
FIG. 2A is a cross-sectional view of a second embodiment of an inventive bumper bar construction.

The bumper bar construction shown in FIG. 2A includes the same elements as those described with reference to FIG. 1A, but further includes a channel 1.1 which extends along the bar in the centre of the broad flange 1, and a corresponding channel 2.5 in the narrow flange 2.1. The two channels 1.1, 2.5 have the form of impressions in respective flanges 1, 2.1 and are open outwardly from the assembled bumper construction. The channels 1.1, 2.5 in respective flanges 1, 2.1 have a stiffening effect on the bumper bar in the final compression stage.

Figure 1B:
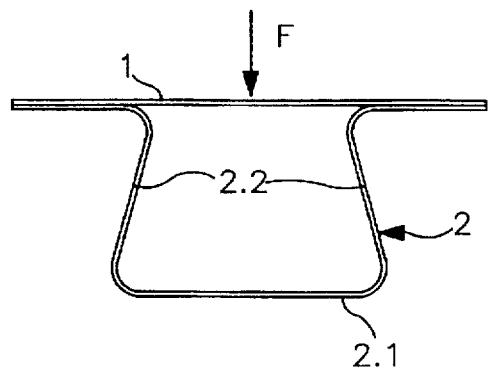
FIG. 1B is a cross-sectional view of the bumper bar construction of FIG. 1A and shows the web of the bumper bar after a certain deformation as a result of impact.
Figure 2B:
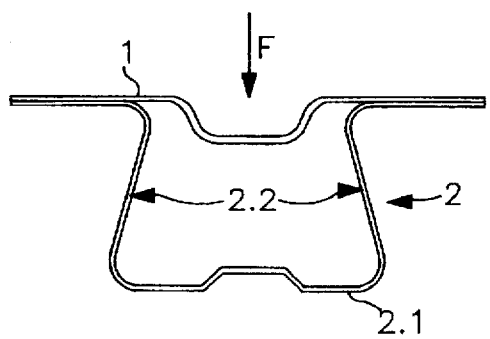
FIG. 2B is a cross-sectional view of the bumper bar construction of FIG. 2A and shows the web of the bumper bar after a certain deformation as a result of impact.

In the event of a collision, the inventive bumper bar is intended to absorb forces that act generally perpendicular to the plane through the broad flange 1 and the narrow flange 2.1 respectively, as indicated by an arrow F in FIGS. 1B and 2B. The bumper bar shown in FIGS. 1A and 2A will therewith be deformed in a controlled manner, meaning that the webs 2.2 will be bent successively in the manner illustrated in FIGS. 1B and 2B. In this case, the fold 2.4 in respective webs 2.2 acts as a guide for deformation of respective webs 2.2 and causes the webs 2.2 to bend towards one another while the broad flange 1 and the narrow flange 2.1 are held essentially intact. This enables the inventive bumper bar to absorb a maximum of impact energy without collapsing in an uncontrolled fashion.

Figure 3:
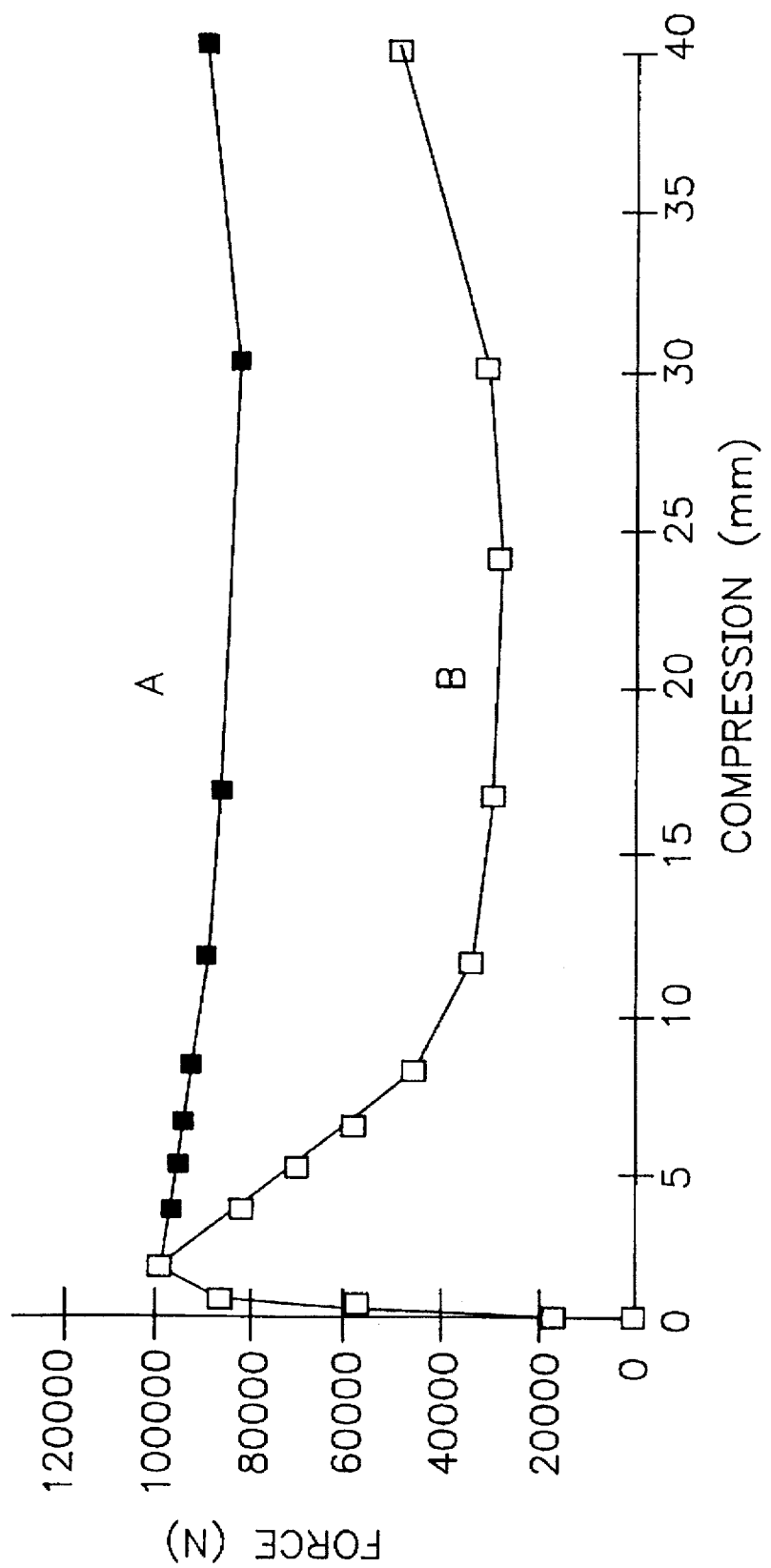
FIG. 3 is a diagram which illustrates deformation of the inventive bumper bar as a function of load.

FIG. 3 shows compression of the bumper bar in mm as a function of force in N. The curve A shows compression of a bumper bar where the fold 2.4 in respective webs 2.2 is spaced from the broad flange 1 by a distance which corresponds at most to one third of the height of said webs 2.2, whereas the curve B shows compression of a bumper bar where the fold 2.4 is located in the centre of the web 2.2. As shown by curve A, a bumper bar construction applicable to this curve is able to withstand a greater force over the whole of the compression process than the bumper bar construction that is applicable to curve B.

The fold 2.4 is so placed in relation to the broad flange 1 as to be able to initiate the controlled bending and compression desired, in which the webs 2.2 are bent continuously towards the broad flange 1 during compression of the bumper bar.

Figure 4:
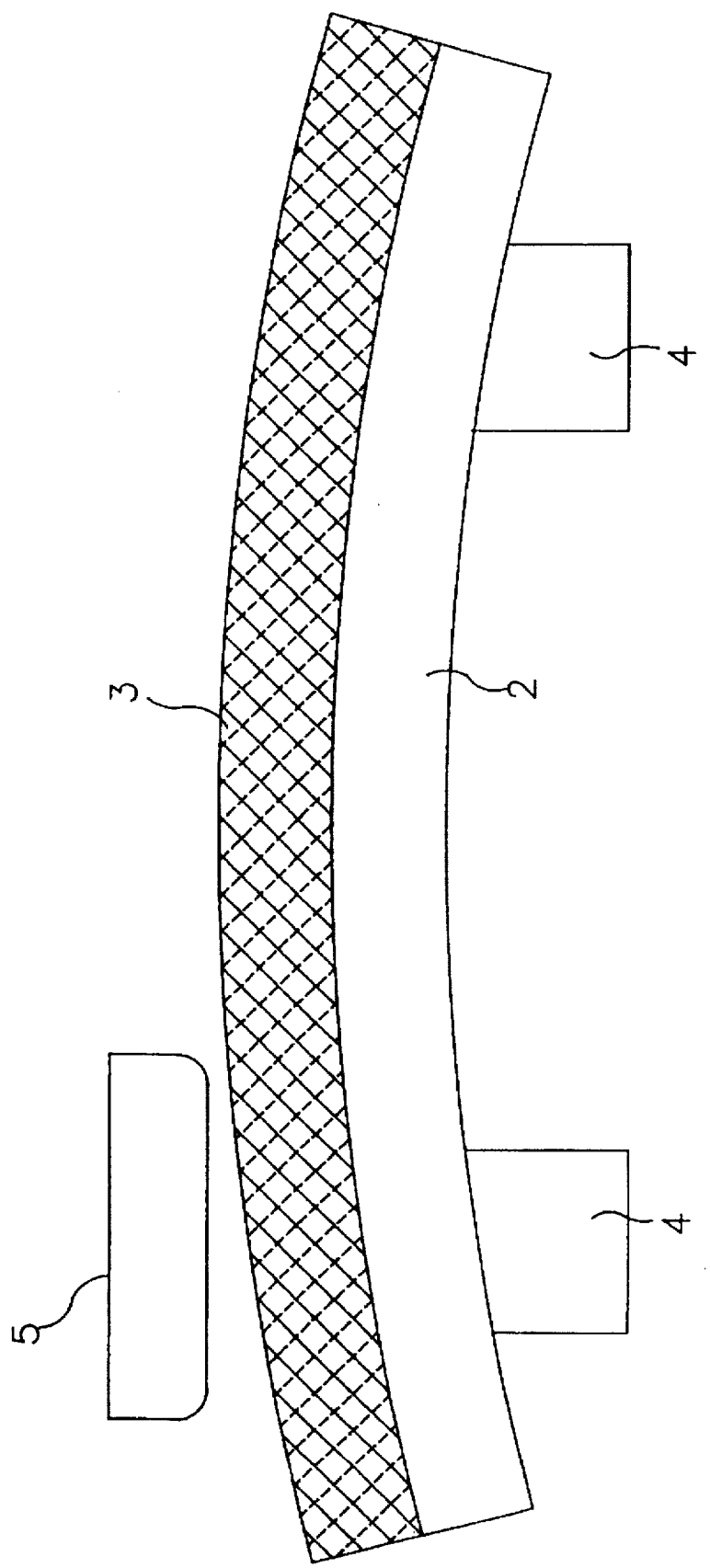
FIG. 4 is a section view of a bumper bar seen vertically from above, said bar being provided with an elastic protective element.
Figure 6:
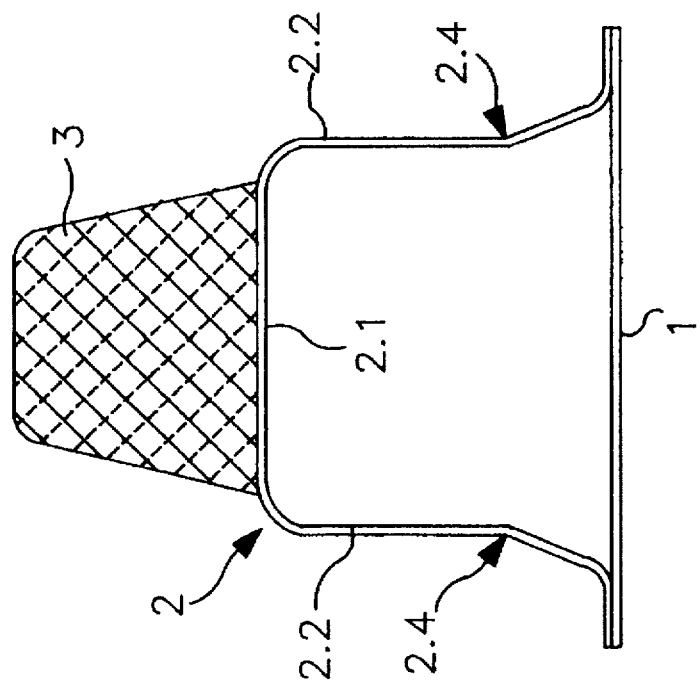
FIG. 6 shows the position of the elastic element on a second embodiment of the inventive bumper bar construction.
Figure 5:
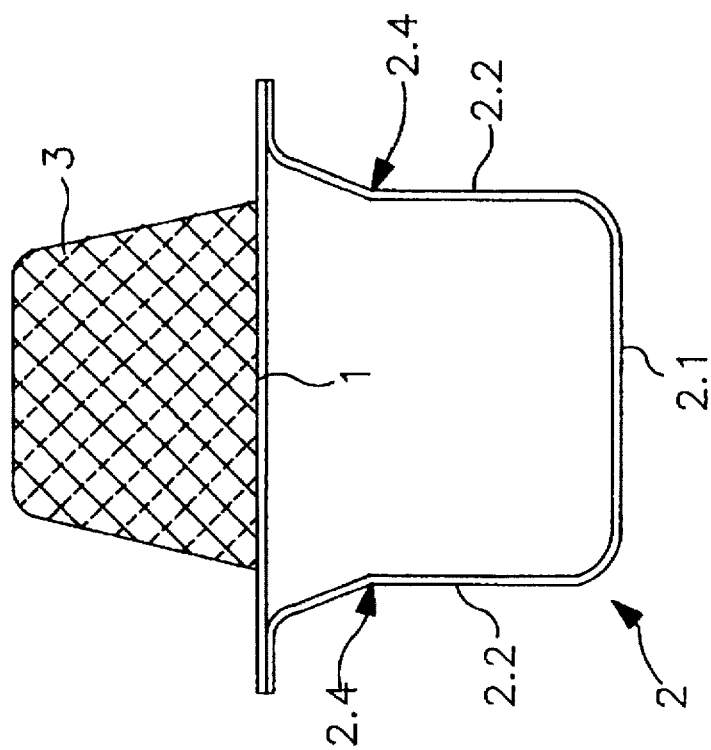
FIG. 5 shows the position of the elastic element on a first embodiment of the inventive bumper bar construction.

The bumper bar section shown in FIG. 4 also includes a resilient protective element 3, made of plastic foam for instance. The bumper bar is supported by two fastener means 4, which may either be placed adjacent the narrow flange 2.1, in which case the protective element 3 is mounted along the broad flange 1 as shown in FIG. 5, or adjacent the broad flange 1, in which case the protective element 3 is placed along narrow flange 2.1 as shown in FIG. 6. FIG. 4 also shows a foreign body 5 responsible for exerting the aforesaid force F indicated in FIGS. 1B and 2B. Irrespective of whether the protective element 3 is positioned according to FIG. 5 or according to FIG. 6 when the force is acting on the protective element, the fold 2.4 will control compression of the bumper bar in a manner which causes the webs 2.2 to bend successively towards the broad flange 1.

In general, inclination of the webs 2.2 is achieved essentially through the medium of the upper web part located between the guide 2.4 and the broad flange 1. If desired, the lower web parts, i.e. the web parts located between the guide 2.4 and the narrow flange 2.1 may also be slightly inclined towards one another in relation to the opening of the U-shaped profile 2, or may be parallel with one another.

It will be understood that the design of the edge flanges 2.3 may vary, e.g. in accordance with the desired configuration of the broad flange 1, and that the edge flanges need not necessarily lie in mutually the same plane.

It will also be understood that the inventive bumper bar may be produced as a single piece structure, such as an extruded structure.

The inventive bumper bar may also have a different cross-sectional shape along those parts thereof that are located at the side of the extension of the fastener means 4.

The inventive bumper bar may also include varying forms of stiffening means along its length. The channels 1.1 and 2.5 may therefore be intermittent.

The invention is not therefore limited to the described and illustrated exemplifying embodiments thereof and modifications and changes can be made within the scope of the following claims.

An example of a bumper bar construction which could possibly be adapted for use in the present invention, along with additional components generally associated with bumper bar construction which might be interchangeable with, or adaptable as, components of the embodiments as described hereinabove, might be disclosed by the following U.S. patent application, assigned to the current assignee of the present application and having the same inventor as the present application: Ser. No. 08/409,806.

Additional examples of bumper bar constructions which could possibly be adapted for use in the present invention, along with additional components generally associated with bumper bar construction which might be interchangeable with, or adaptable as, components of the embodiments as described hereinabove, might be disclosed by the following U.S. Pat. Nos. 5,080,411; 4,948,196; 4,838,606; 4,786,946 and 4,073,528.

Further examples of bumper bar constructions which could possibly be adapted for use in the present invention, along with additional components generally associated with bumper bar construction which might be interchangeable with, or adaptable as, components of the embodiments as described hereinabove, might be disclosed by the following World Intellectual Property Organization Patents: WO 9304897 and WO 9420322.

Other examples of bumper bar constructions which could possibly be adapted for use in the present invention, along with additional components generally associated with bumper bar construction which might be interchangeable with, or adaptable as, components of the embodiments as described hereinabove, might be disclosed by the following foreign patents: French Patent No. 2 207 039 and Swedish Patent 38941. As understood, the French patent relates to horizontal beams used to reinforce a motor vehicle door. The beams are used to absorb energy and thereby protect occupants in the event of side collision. The shape and configuration of the beams are disclosed in FIGS. 1–4 of the French patent. As understood, the Swedish patent is a design patent relating to the design of a construction element. Because a drawing of the construction element is included within the patent, a full disclosure of the Swedish patent is made by the drawing included therein.

The components disclosed in the various publications, disclosed or incorporated by reference herein, may be used in the embodiments of the present invention, as well as equivalents thereof.

The appended drawings in their entirety, including all dimensions, proportions, and/or shapes in at least one embodiment of the invention are accurate and to scale and are hereby included by reference into this specification.

All, or substantially all, of the components and methods of the various embodiments may be used with at least one embodiment or all of the embodiments, if more than one embodiment is described herein.

All of the patents, patent applications, and publications recited herein, and in the Declaration attached hereto, are hereby incorporated by reference as if set forth in their entirety herein.

The corresponding foreign and international patent publication applications, namely, Swedish Patent Application No. 9400227-6, filed on Jan. 26, 1994, and International Patent Application No. PCT/SE95/00054, filed on Jan. 20, 1995, having inventor Martin Jonsson, as well as their published equivalents, and other equivalents or corresponding applications, if any, in corresponding cases in Sweden and elsewhere, and the references cited in any of the documents cited herein, are hereby incorporated by reference as if set forth in their entirety herein.

The details in the patents, patent applications and publications may be considered to be incorporable, at Applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function, and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A bumper bar construction for use in an automobile, to absorb collision impact energies, said bumper bar construction having a closed and substantially trapezoidal cross-sectional shape, said bumper bar construction comprising:
   a broad flange on one side of the substantially trapezoidal cross-sectional shape;
   said broad flange having a first width;
   the first width of said broad flange being disposed along the substantially trapezoidal cross-sectional shape;
   said broad flange having an axis substantially perpendicular to said broad flange;
   a narrow flange on the side of the substantially trapezoidal cross-sectional shape opposite said broad flange;
   said narrow flange having a second width;
   the second width of said narrow flange being disposed along the substantially trapezoidal cross-sectional shape;
   the first width of said broad flange being substantially greater than the second width of said narrow flange;
   said narrow flange being disposed a first distance along said axis from said broad flange;
   said bumper bar construction having a longitudinal axis substantially perpendicular to the cross-sectional shape;
   a first web connecting said broad flange and said narrow flange;
   a second web connecting said broad flange and said narrow flange;
   at least one of said first web and said second web comprising:
   a first portion;
   said first portion being disposed adjacent to said broad flange;
   said first portion extending a substantial distance away from said broad flange and towards said narrow flange;
   a second portion;
   said second portion being disposed adjacent to said narrow flange;
   said second portion extending a substantial distance away from said narrow flange and towards said broad flange;
   said first portion being disposed at an angle to said second portion;
   said angle being disposed within the closed cross-sectional shape;
   said angle being substantially greater than 180°;
   a guide to permit folding of said first portion with respect to said second portion upon application of collision impact energies;
   said guide being disposed between said first portion and said second portion;
   said guide comprising a fold;
   said fold extending along said bumper bar construction substantially parallel to the longitudinal axis;
   said fold being disposed a second distance from said broad flange; and
   the second distance being no greater than one third of the first distance;
   the second distance being no less than one eighth of the first distance;
   said first portion of said at least one of said first web and said second web being substantially planar;
   said second portion of said at least one of said first web and said second web being substantially planar;
   said first web comprising:
   a first end;
   said first end being disposed adjacent to said broad flange;
   said first end comprising a first web edge flange;
   said first web edge flange being disposed substantially parallel to said broad flange; and
   said first web edge flange comprising means for attaching said first web to said broad flange; and said second web comprising:
   a second end;
   said second end being disposed adjacent to said broad flange;
   said second end comprising a second web edge flange;
   said second web edge flange being disposed substantially parallel to said broad flange; and
   said second web edge flange comprising means for attaching said second web to said broad flange.

2. The bumper bar construction according to claim 1 wherein:
   said narrow flange, said first web and said second web form a U-shaped profile;
   said U-shaped profile is a single unitary piece;
   said first web edge flange extends from said first end of said first web away from said second web;
   said first web edge flange is fixedly attached to said broad flange;
   said second web edge flange extends from said second end of said second web away from said first web; and
   said second web edge flange is fixedly attached to said broad flange.

3. The bumper bar construction according to claim 2 wherein:
   at least one of said broad flange and said narrow flange comprises at least one channel;
   said at least one channel extends along said bumper bar construction substantially parallel to the longitudinal axis;

said at least one channel extends into the closed cross-sectional shape;

said at least one channel comprises a first flange portion;

said first flange portion is disposed substantially parallel to said at least one of said broad flange and said narrow flange;

said first flange portion is disposed a third distance from a major portion of its corresponding flange; and the third distance is substantially less than the first distance.

4. The bumper bar construction according to claim 3, further comprising:

means for protecting said impact beam;

said means for protecting comprises at least one resilient element;

said at least one resilient element is mounted on the exterior of the closed cross-sectional shape; and said at least one resilient element is mounted on at least one of said broad flange and said narrow flange.

5. The bumper bar construction according to claim 4 wherein:

said first web comprises said first portion and said second portion;

said second web comprises a third portion and a fourth portion;

said third portion is disposed adjacent to said broad flange;

said third portion extends a substantial distance away from said broad flange and towards said narrow flange;

said third portion is substantially planar;

said fourth portion is disposed adjacent to said narrow flange;

said fourth portion extends a substantial distance away from said narrow flange and towards said broad flange;

said fourth portion is substantially planar;

said third portion is disposed at a further angle to said fourth portion;

said further angle is disposed within the closed cross-sectional shape;

said further angle is substantially greater than 180°;

a further fold is disposed between said third portion and said fourth portion;

said further fold extends along said second web substantially parallel to the longitudinal axis;

said broad flange comprises said at least one channel;

said first flange portion is disposed substantially parallel to said broad flange;

said narrow flange comprises a further channel; said further channel extends along said bumper bar construction substantially parallel to the longitudinal axis;

said further channel extends into the closed cross-sectional shape;

said further channel comprises a second flange portion;

said second flange portion is disposed substantially parallel to said narrow flange;

said second flange portion is disposed a fourth distance from said broad flange; and the fourth distance is substantially less than the first distance.

6. An impact beam, having a closed and substantially trapezoidal cross-sectional shape, for use in a motor vehicle to absorb collision impact energies, said impact beam comprising:

a first side;

said first side comprising a first flange;

a second side;

said second side comprising a second flange;

said second flange being disposed opposite said first flange;

said first flange and said second flange comprising the substantially parallel sides of the substantially trapezoidal cross-sectional shape;

a third side;

said third side comprising a first web;

a fourth side;

said fourth side comprising a second web;

said second web being disposed opposite said first web;

said first web connecting said first flange to said second flange;

said second web connecting said first flange to said second flange;

at least one of said first web and said second web comprising both a first portion and a second portion;

said first portion being disposed adjacent to said first flange;

said first portion extending a substantial distance away from said first flange and towards said second flange;

said second portion being disposed adjacent to said second flange;

said second portion extending a substantial distance away from said second flange and towards said first flange;

a fold being disposed between said first portion and said second portion;

said first portion being disposed at an angle to said second portion;

said angle being disposed within the closed cross-sectional shape;

said angle being substantially greater than 180°;

said second flange being disposed a first distance from said first flange;

said fold being disposed a second distance from said first flange;

the second distance being no greater than one third of the first distance;

said first flange having a first width;

the first width of said first flange being disposed along the substantially trapezoidal cross-sectional shape;

said second flange having a second width;

the second width of said second flange being disposed along the substantially trapezoidal cross-sectional shape;

the first width of said first flange being substantially greater than the second width of said second flange;

said second distance being no less than one eighth of said first distance;

said impact beam having a longitudinal axis substantially perpendicular to the cross-sectional shape;

said fold extending along said at least one of said first web and said second web substantially parallel to the longitudinal axis;

said first web comprising:
  a first end;
  said first end being disposed adjacent to said first flange;
  said first end comprising a first web edge flange;
  said first web edge flange being disposed substantially parallel to said first flange; and
  said first web edge flange comprising means for attaching said first web to said first flange;

said second web comprising:
a second end;
said second end being disposed adjacent to said first flange;
said second end comprising a second web edge flange;
said second web edge flange being disposed substantially parallel to said first flange; and
said second web edge flange comprising means for attaching said second web to said first flange;
said first portion of said at least one of said first web and said second web being substantially planar; and
said second portion of said at least one of said first web and said second web being substantially planar.

7. The impact beam according to claim 6 wherein:
said second flange, said first web and said second web form a U-shaped profile;
said U-shaped profile is a single unitary piece;
said first web edge flange extends from said first end of said first web away from said second web;
said first web edge flange is fixedly attached to said first flange;
said second web edge flange extends from said second end of said second flange away from said first web; and
said second web edge flange is fixedly attached to said first flange.

8. The impact beam according to claim 7 wherein:
at least one of said first flange and said second flange comprises at least one channel;
said at least one channel is substantially parallel to the longitudinal axis;
said at least one channel extends into the closed cross-sectional shape;
said at least one channel comprises a first flange portion;
said first flange portion is disposed substantially parallel to said at least one of said first flange and said second flange;
said first flange portion is disposed a third distance from a major portion of its corresponding flange; and
the third distance is substantially less than the first distance.

9. The impact beam according to claim 8, further comprising:
means for protecting said impact beam;
said means for protecting comprises at least one resilient element;
said at least one resilient element is mounted on the exterior of the closed cross-sectional shape; and
said at least one resilient element is mounted on at least one of said first flange and said second flange.

10. The impact beam according to claim 9 wherein:
said first web comprises said first portion and said second portion;
said fold extends along said first web substantially parallel to the longitudinal axis;
said second web comprises a third portion and a fourth portion;
said third portion is disposed adjacent to said first flange;
said third portion extends a substantial distance away from said first flange and towards said second flange;
said third portion is substantially planar;
said fourth portion is disposed adjacent to said second flange;
said fourth portion extends a substantial distance away from said second flange and towards said first flange;
said fourth portion is substantially planar;
said third portion is disposed at a further angle to said fourth portion;
said further angle is disposed within the closed cross-sectional shape;
said further angle is substantially greater than 180°;
a further fold is disposed between said third portion and said fourth portion;
said further fold extends along said second web substantially parallel to the longitudinal axis;
said first flange comprises said at least one channel;
said first flange portion is disposed substantially parallel to said first flange;
said second flange comprises a further channel;
said further channel is substantially parallel to the longitudinal axis;
said further channel extending into the closed cross-sectional shape;
said further channel comprises a second flange portion;
said second flange portion is disposed substantially parallel to said second flange;
said second flange portion is disposed a fourth distance from said first flange; and
the fourth distance is substantially less than the first distance.

11. An impact beam, having a closed and substantially trapezoidal cross-sectional shape, for absorbing collision impact energies, said impact beam for use on a motor vehicle as at least one of a bumper bar and an impact beam for the side of a motor vehicle, said impact beam comprising:
a first side;
said first side comprising a first flange;
said first flange having a first width;
the first width of said first flange being disposed along the substantially trapezoidal cross-sectional shape;
a second side;
said second side comprising a second flange;
said second flange being disposed opposite said first flange;
said second flange having a second width;
the second width of said second flange being disposed along the substantially trapezoidal cross-sectional shape;
the first width of said first flange being substantially greater than the second width of said second flange;
said first flange and said second flange comprising the substantially parallel sides of the substantially trapezoidal cross-sectional shape;
a third side;
said third side comprising a first web;
a fourth side;
said fourth side comprising a second web;
said first web connecting said first flange to said second flange;
said second web connecting said first flange to said second flange;
at least one of said first web and said second web comprising both a first portion and a second portion;
said first portion being disposed adjacent to said first flange;
said first portion extending a substantial distance away from said first flange and towards said second flange;
said first portion being substantially planar;

said second portion being disposed adjacent to said second flange;

said second portion extending a substantial distance away from said second flange and towards said first flange;

said second portion being substantially planar;

said first portion being disposed at an angle to said second portion;

said angle being disposed inside the closed cross-sectional shape;

said angle being substantially greater than 180°;

a fold being disposed between said first portion of at least one of said first web and said second web and said second portion of at least one of said first web and said second web;

said second flange being disposed a first distance from said first flange;

said fold being disposed a second distance from said first flange;

the second distance being no greater than one third of the first distance;

said second distance being no less than one eighth of said first distance;

said impact beam having a longitudinal axis substantially perpendicular to the cross-sectional shape;

said fold extending along said at least one of said first web and said second web substantially parallel to the longitudinal axis;

said first web comprising:
 a first end;
 said first end being disposed adjacent to said first flange;
 said first end comprising a first web edge flange;
 said first web edge flange being disposed substantially parallel to said first flange; and
 said first web edge flange comprising means for attaching said first web to said first flange; and said second web comprising:
 a second end;
 said second end being disposed adjacent to said first flange;
 said second end comprising a second web edge flange;
 said second web edge flange being disposed substantially parallel to said first flange; and
 said second web edge flange comprising means for attaching said second web to said first flange.

12. The impact beam according to claim 11 wherein:

said second flange, said first web and said second web form a U-shaped profile;

said U-shaped profile comprises a single homogeneous piece;

said first web edge flange extends from said first end of said first web away from said second web;

said first web edge flange is fixedly attached to said first flange;

said second web edge flange extends from said second end of said second web away from said first web; and said second edge flange is fixedly attached to said first flange.

13. The impact beam according to claim 12 wherein:

at least one of said first flange and said second flange comprises at least one channel;

said at least one channel is substantially parallel to the longitudinal axis;

said at least one channel extends into the closed cross-sectional shape;

said at least one channel comprises a first flange portion;

said first flange portion is disposed substantially parallel to said at least one of said first flange and said second flange;

said first flange portion is disposed a third distance from a major portion of its corresponding flange; and the third distance is substantially less than the first distance.

14. The impact beam according to claim 13, further comprising:

means for protecting said impact beam;

said means for protecting comprises at least one resilient element;

said at least one resilient element is mounted on the exterior of the closed cross-sectional shape; and said at least one resilient element is mounted on at least one of said first flange and said second flange.

15. The impact beam according to claim 14 wherein:

said first web comprises a first portion and a second portion;

said fold extends along said first web substantially parallel to the longitudinal axis;

said second web comprises a third portion and a fourth portion;

said third portion is disposed adjacent to said first flange;

said third portion extends a substantial distance away from said first flange and towards said second flange;

said third portion is substantially planar;

said fourth portion is disposed adjacent to said second flange;

said fourth portion extends a substantial distance away from said second flange and towards said first flange;

said fourth portion is substantially planar;

said third portion is disposed at a further angle to said fourth portion;

said further angle is disposed within the closed cross-sectional shape;

said further angle is substantially greater than 180;

a further fold is disposed between said third portion and said fourth portion;

said further fold extends along said second web substantially parallel to the longitudinal axis;

said first flange comprises said at least one channel;

said first flange portion is disposed substantially parallel to said first flange;

said second flange comprises a further channel;

said further channel is substantially parallel to the longitudinal axis;

said further channel extends into the closed cross-sectional shape;

said further channel comprises a second flange portion;

said second flange portion is disposed substantially parallel to said second flange;

said second flange portion is disposed a fourth distance from said first flange; and the fourth distance is substantially less than the first distance.

* * * * *

UNITED STATES PATENT AND TRADEMARK OFFICE
CERTIFICATE OF CORRECTION

PATENT NO.   : 5,722,708
DATED        : March 3, 1998
INVENTOR(S)  : Martin JONSSON It is certified that error appears in the above-identified patent and that said Letters Patent is hereby corrected as shown below:

On the title page, item [56], under the FOREIGN PATENT DOCUMENTS section, before the '7/1992' reference, delete "404208643 A" and insert --404 208 634 A--.

Signed and Sealed this

Eighteenth Day of August, 1998

Attest:

BRUCE LEHMAN

Attesting Officer

Commissioner of Patents and Trademarks